Jan. 13, 1942.  N. OTTAVIANI  2,270,171

SHELLING ALMONDS AND SIMILAR FRUITS

Filed Feb. 24, 1939

Inventor:
NICOLA OTTAVIANI
C. F. Wenderoth
By
Attorney

Patented Jan. 13, 1942

2,270,171

UNITED STATES PATENT OFFICE 2,270,171

SHELLING ALMONDS AND SIMILAR FRUITS

Nicola Ottaviani, Canicatti, Agrigento, Italy

Application February 24, 1939, Serial No. 258,336
In Italy March 15, 1938

2 Claims. (Cl. 146—10)

This invention relates to a new apparatus for cutting the shell of almonds, kerns of pine-apples, pistacchio-nuts, hazel-nuts and similar fruits in two parts, without breaking the kernel, and also for separating the kernel from the two parts of the shell.

Hitherto the shelling of this kind of fruits was always carried out by crushing the shell or by the action of friction means. The devices used for this operation did not provide for mechanical separation of the kernels from the shells which were always broken to small pieces. For this reason the cost of the manual work forms a high percentage of the price of the shelled kernels.

The present invention permits a mechanical separation of the shells from the kernels as the shell is cut cleanly into two parts. The cut follows preferably a transverse plane with reference to the longitudinal axis of the fruit, and in order to permit easy removal of the kernel the cut lies in the thickest zone of the shell. It is not necessary that the cut be always perpendicular to the longitudinal axis of the fruit, as a slight inclination facilitates sometimes the falling out of the kernels, as for instance in almonds. Preferably the cutting is done by the sliding of the fruit under pressure against the edge of a strong blade. It has been found that by operating in this way the shell splits under the action of the blade exactly in the direction of the cutting edge. It is therefore not necessary that the blade penetrates the entire thickness of the shell and consequently the kernel need not be touched by the blade. For good result it is essential that the fruit be not compressed at the ends of its longitudinal axis during the cutting operation, as otherwise the shell would be broken into a number of small pieces instead of only two pieces, as is desirable in order to facilitate the mechanical separation of the kernels from the shells.

It is to be understood that different devices may be designed in order to realize the process described, but essentially an apparatus for shelling almonds and the like according to the invention will always comprise a container for the calibrated fruits, at least one rotating wheel having spoon like means for taking from the container and transporting a single fruit to the cutting device, means for placing the fruit in the correct position for cutting, means holding the fruit during the action of the cutting device, a cutting device which will yield if a certain pressure is exceeded, means permitting the kernels to discharge from the cut shells and means to separate the kernels from the shells.

In the drawing an apparatus for shelling almonds is shown by way of example:

Figures 3, 3A:
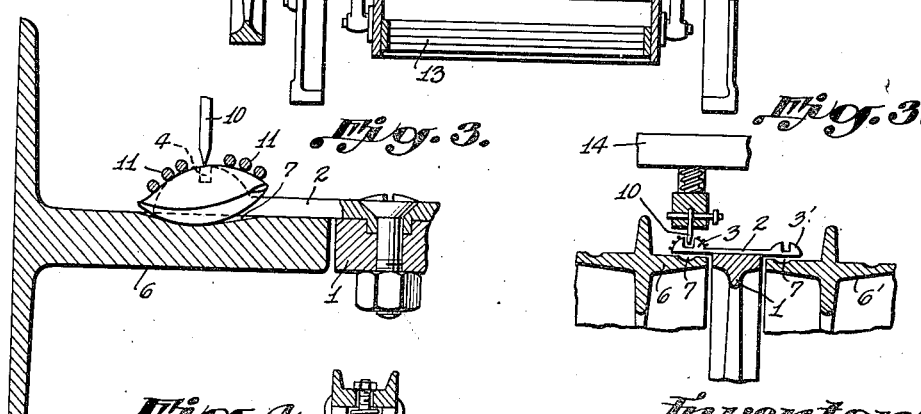
Figure 4:
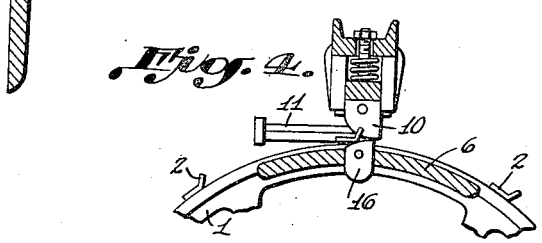

Figs. 3 and 3ª show on a larger scale in detail cross-sectional view how the almond is guided beneath the cutting device, and Fig. 4 shows a detail cross-sectional view of a different form of execution of the cutting device.

An apparatus for shelling almonds is shown by way of example in the drawing and comprises a transporting wheel 1 which is provided on the periphery thereof with a plurality of transversely disposed arms 2. At one end of each arm 2 there is provided a spoon 3 and at the other end a spoon 3' which project beyond the rim of the transporting wheel.

A slit 4 is provided in each spoon which permits the passage of a cutting blade 10. The transporting wheel rotates on the shaft 5 and its upper half is flanked on each side by fixed semi-circular supporting flanges 6 and 6'. The projecting spoons 3 and 3' slide over the upper guiding semi-circular surfaces of the flanges 6 and 6' and in doing so each spoon will transport an almond from the container 9 towards the cutting device 10.

There is provided in the semi-circular guiding supporting flanges 6 and 6' a channel 7 and 7' respectively located under and aligned with the slits 4 in the spoons 3 and 3'. These channels 7 and 7' have inclined surfaces as shown particularly in Figures 3 and 3ª which will guide the almonds taken up by the spoons from the container and cause them to orient themselves so that the thickest portion of the almonds is located directly over the bottom of the channel 7 or 7' and therefore also located directly under the blade 10 which extends into the slits 4.

In order to insure that a proper positioning of the almonds is obtained, inclined steps 8 are provided in the semi-circular flanges 6 and 6' before the guide channels begin therein. These inclined steps 8 will prevent any upright orientation of the almonds in the spoons and thereby will prevent any incorrect cutting of such almonds. If the almonds should be in upright position the steps 8 will compel such almonds to fall down. At substantially the highest point of the transporting wheel the almonds are led under the blade 10 and at this point, in order to avoid any slipping of such almonds during the cutting operation, elastic wires 11 which will adapt themselves to the different shapes and forms of the almonds are provided in order to hold the almonds during the actual cutting operation.

Figure 1:
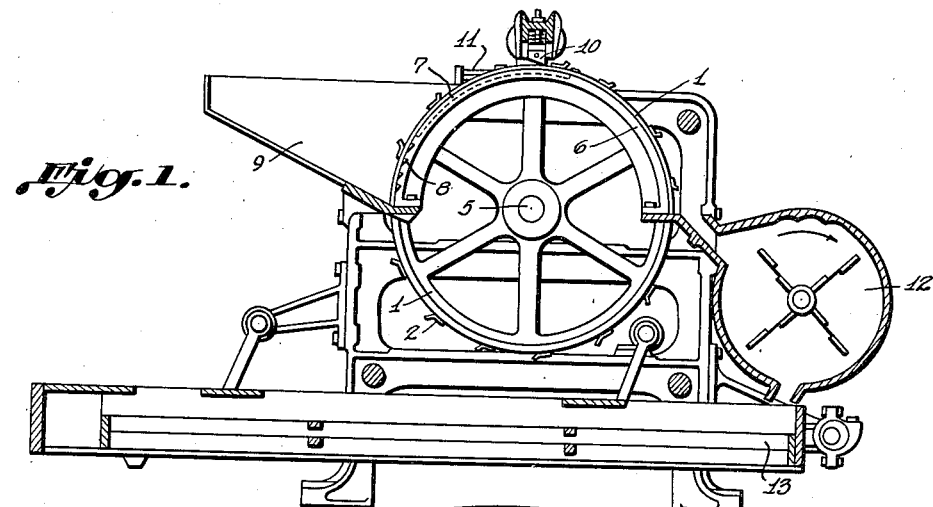
Fig. 1 shows a diagrammatical side view of the apparatus.
Figure 2:
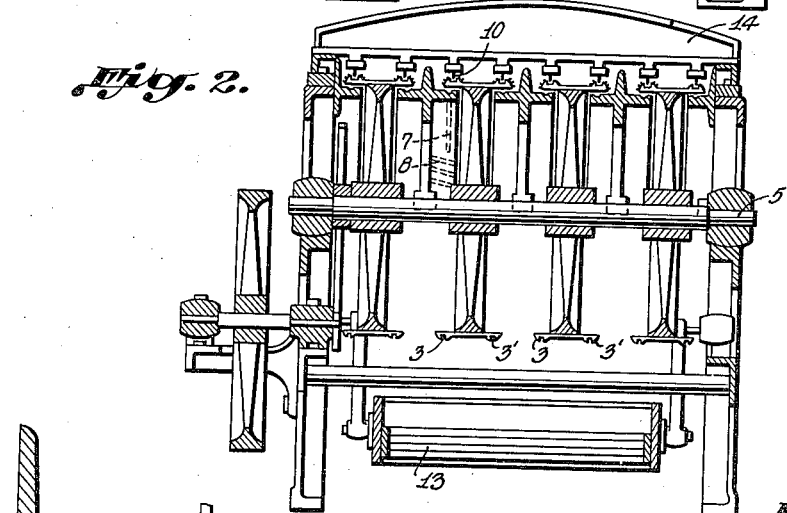
Fig. 2 is a cross sectional view showing particularly the plurality of transport wheels.

As particularly shown in Figure 2 there are a plurality of transporting wheels 1 provided which are fixed on the shaft 5 and each of these wheels may take from different compartments of the container 9, almonds of a different caliber. As shown, the cutting devices and the blades 10 may be mounted on the same bridge 14 extending across the entire apparatus and may be individually adjusted.

After the cutting of the almonds in the manner described they are transported by the spoons to the rotating beater 12 in which the kernels discharge from the shells. From the beater 12 the kernels and shells are discharged into a horizontal shaking sieve 13 located below the apparatus. This shaking sieve 13 may also have different compartments therein which are provided with oval holes for the separation of the kernels from the shells.

The operation of the apparatus is as follows: The almonds to be treated are calibrated and then introduced into the proper compartments in the container 9. Each compartment of the container is aligned with a transporting wheel 1 and each of the transversely disposed arms 2 upon such wheel will take up from such compartment by means of its spoons 3 and 3', two almonds. The spoons then slide on the semi-circular flanges 6 and 6' and transport the almonds upwardly. The steps 8 on the lower portion of the flanges 6 and 6' orient all of the almonds in a horizontal position and the channels 7 and 7' which are located above the steps 8 then compel the almonds, due to the inclined surfaces of the channels 7 and 7', to locate themselves with their thickest portion in alignment with the bottom line of the channels.

Upon further progress towards the cutting device, the almonds finally reach the spring wires 11 and slide beneath them under the blade 10 which enters the slits 4 of the spoon. A cut is thereby made in the almonds at the thickest portion of the shell. Under the pressure of the blade the almonds shell is broken along the plane of the blade and since the shell is not under compression at its ends such shell is divided into only two portions. Furthermore, as the cut is on the thickest section of the almond the kernel will fall easily from the shell as soon as the cut almonds are shaken in the rotating beater 12. Since the two portions of the shell are generally always greater than the kernel, separation may be easily made on the mechanical sieve 13 located beneath the machine. The almonds will fall through the oval holes of the sieve.

It is understood that the apparatus may be varied as to details and that the device is not limited to the form shown and described.

What I claim is:

1. An apparatus for shelling nuts and the like, comprising a container for said nuts, a plurality of rotating wheels located adjacent said container, transversely projecting arms having spoon-like ends mounted on said wheels, semi-circular flanges of substantially the same diameter as said wheels located at the sides of said wheels, inclined steps upon said flanges located upon said flanges adjacent said container, said flanges having channels therein for guiding the nuts taken from said container by said spoon-like ends, cutting means located adjacent said wheels, spring wires located adjacent said cutting means cooperating with the nuts when held in said spoon-like ends during the operation of said cutting means, said cutting means cooperating with each of said wheels and comprising blades for cutting the upper portion of each nut.

2. An apparatus for cutting the shells of almonds and the like, comprising a container for said almonds, a rotating transporting wheel located adjacent said container, spoons located on said wheel for removing almonds singly from said container, semi-circular guiding means located adjacent said transporting wheel and serving as guides for said spoons, a channel in said guide means in which the single almonds taken up by said spoons slide upwardly so as to orient themselves with their line of greatest thickness positioned according to the bottom of said channel, a cutting device located at substantially the highest point of said semi-circular guide means, said cutting device comprising a cutting blade located in the plane of the bottom line of said channel to cut the shell of said almonds, spring wires holding said almonds in the correct position during the action of said cutting means and means for releasing the pressure of said cutting means when a certain predetermined pressure is exceeded.

NICOLA OTTAVIANI.